United States Patent [19]

Rush et al.

[11] Patent Number: 4,966,741

[45] Date of Patent: Oct. 30, 1990

[54] METHOD OF MAKING SHAPE RETENTION HOSE CONSTRUCTION

[75] Inventors: James B. Rush, Springfield, Mo.; James S. Bryan, Clyde; Pearison W. Henry, Sylva; Richardson J. Trantham, Clyde, all of N.C.

[73] Assignee: Dayco Products, Inc., Dayton, Ohio

[21] Appl. No.: 270,140

[22] Filed: Nov. 14, 1988

[51] Int. Cl.$^5$ .............................................. B28B 1/48
[52] U.S. Cl. ..................................... 264/154; 264/257; 264/286; 138/103; 138/109; 138/122; 138/174; 138/178; 138/DIG. 6
[58] Field of Search ............... 138/103, 109, 121, 122, 138/172, 139, 173, 174, 178, 134, DIG. 8; 264/154, 241, 257, 286, 293, 294, DIG. 52

[56] References Cited

U.S. PATENT DOCUMENTS

| | | | |
|---|---|---|---|
| 2,704,556 | 3/1955 | Blish | 138/DIG. 8 |
| 2,998,028 | 8/1961 | Rohde | 138/DIG. 8 |
| 4,463,779 | 8/1984 | Wink et al. | 138/125 |
| 4,600,146 | 7/1986 | Ohno | 138/DIG. 8 |
| 4,669,508 | 6/1987 | Neaves | 138/121 |

FOREIGN PATENT DOCUMENTS 222875  9/1959  Austria ......................... 138/DIG. 8

Primary Examiner—James E. Bryant, III
Attorney, Agent, or Firm—Joseph V. Tassone

[57] ABSTRACT

A shape retention hose construction and method of making the same are provided, the hose construction comprising a length of flexible tubular hose formed mainly of polymeric material and having opposite end portions and an intermediate body portion that defines internal and external peripheral surfaces of the hose, and a shape retention unit carried by the hose and being adapted to generally retain the shape of the hose construction when the hose and its carried shape retention structure are jointly bent into a particular shape, the shape retention unit comprising a deformable elongated member having opposed ends, the hose having a radially outwardly disposed and longitudinally extending projection on the external peripheral surface thereof, the elongated member being longitudinally disposed in the projection, the projection having opposed ends that respectively are disposed inboard of the opposite end portions of the hose, the opposed ends of the elongated member also being respectively disposed inboard of the opposite end portions of the hose, the end portions of the hose respectively having external peripheral surfaces that have substantially circular cross-sectional configurations through-out the axial lengths thereof.

7 Claims, 3 Drawing Sheets

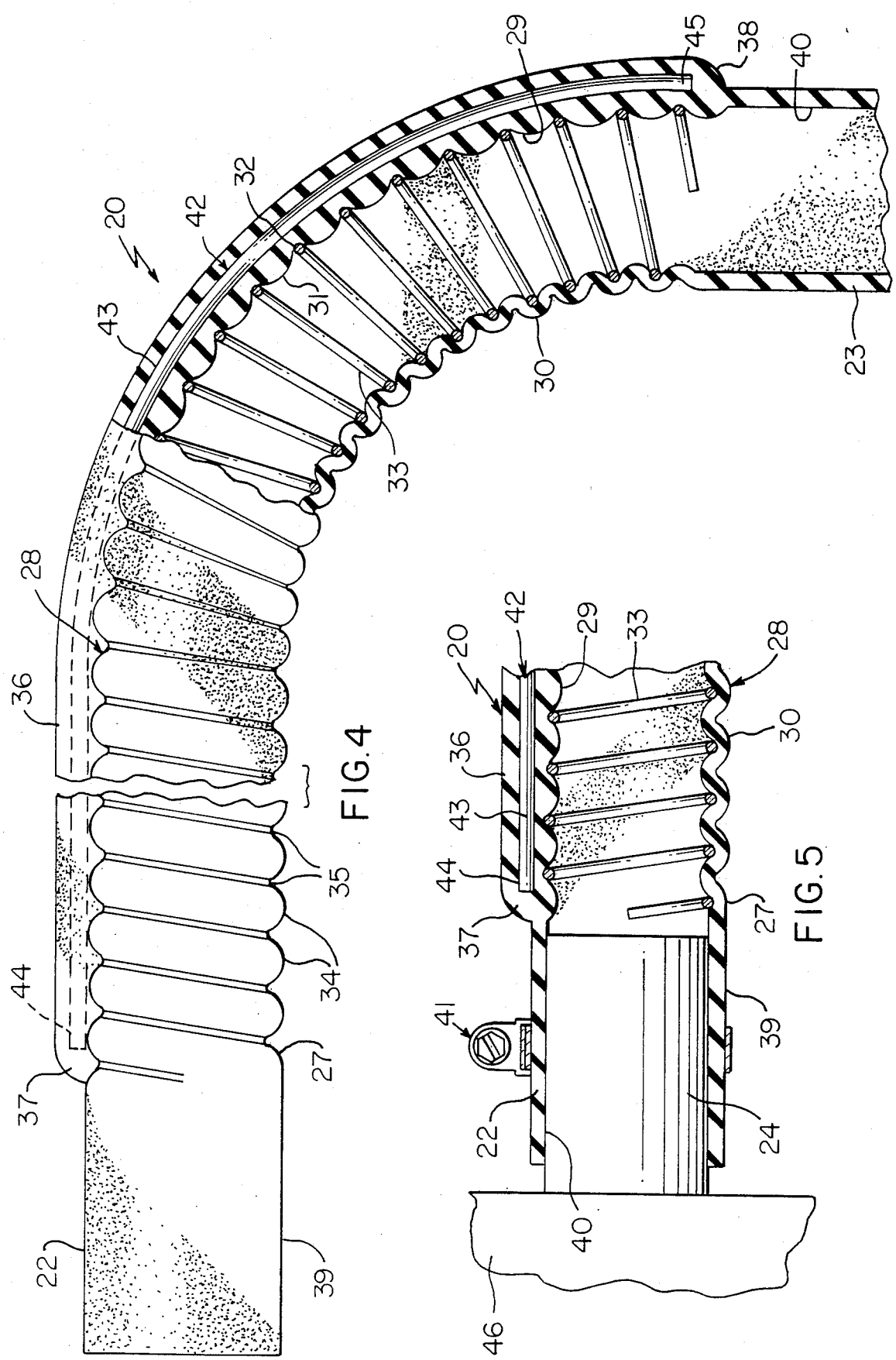

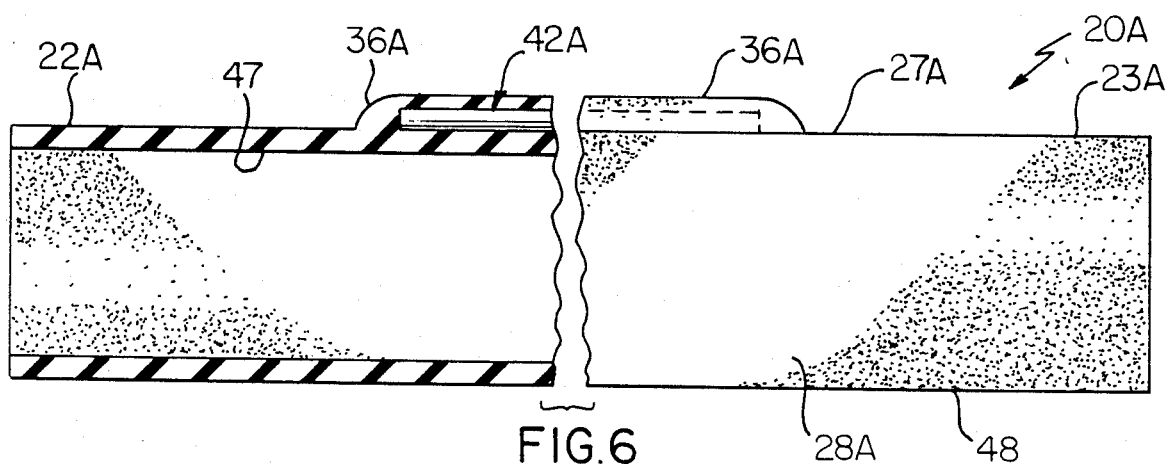
FIG. 6
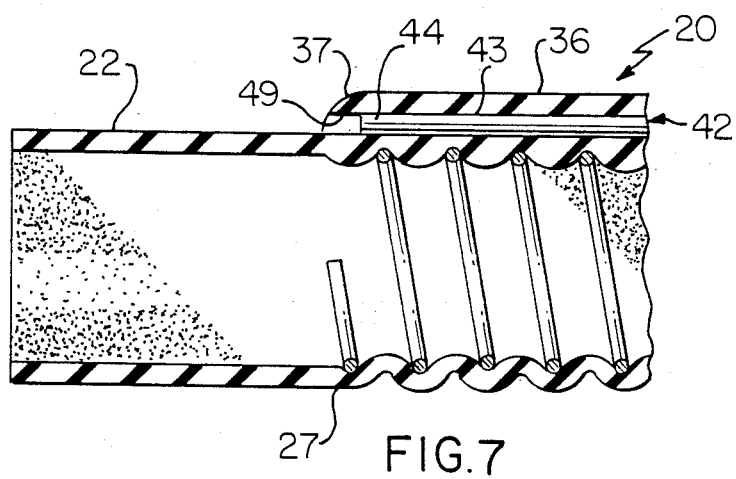
FIG. 7
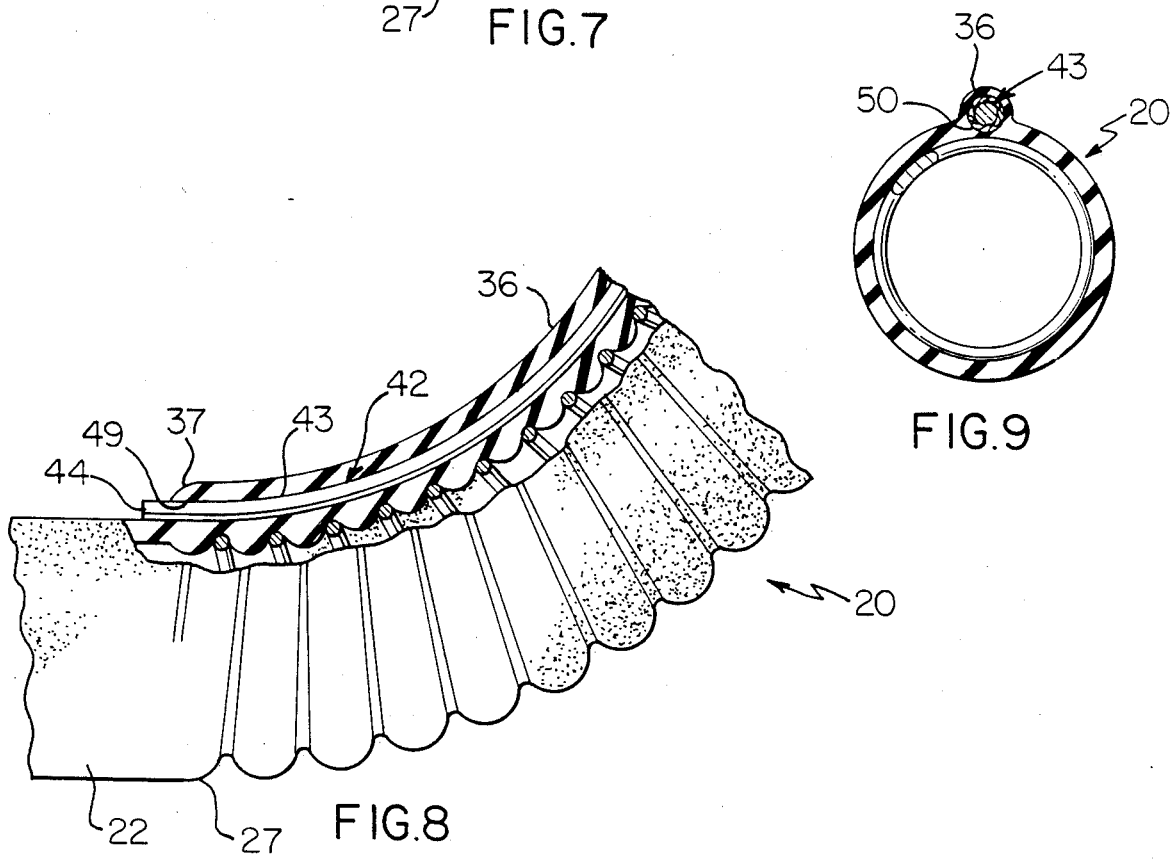
FIG. 8
FIG. 9

4,966,741

METHOD OF MAKING SHAPE RETENTION HOSE CONSTRUCTION

BACKGROUND OF THE INVENTION

1. Field of the Invention

This invention relates to a new shape retention hose construction and to a new method of making such a hose construction.

2. Prior Art Statement

It is known to provide a shape retention hose construction comprising a length of flexible tubular hose formed mainly of polymeric material and having opposite end portions and an intermediate body portion that defines internal and external peripheral surface means of the hose, and shape retention means carried by the hose and being adapted to generally retain the shape of the hose construction when the hose and its carried shape retention means are jointly bent into a particular shape, the shape retention means comprising a deformable elongated member having opposed ends, the hose having a radially outwardly disposed and longitudinally extending projection on the external peripheral surface means thereof, the elongated member being longitudinally disposed in the projection. For example, see the U.S. Pat. No. 4,669,508 to Neaves, and the U.S. Pat. No. 4,463,779, to Wink et al.

SUMMARY OF THE INVENTION

It is one feature of this invention to provide a new shape retention hose construction with unique shape retention means carried by the flexible hose thereof in such a manner that the resulting hose construction can be bent into a particular shape thereof and generally retain that shape while being readily adapted to have the opposed end portions thereof clamped to the desired supporting structure without interference from the shape retention means.

In particular, it was found according to the teachings of this invention that the shape retention means of a shape retention hose construction can comprise a radially outwardly disposed and longitudinally extending projection on the external peripheral surface means of the hose with that projection having the proposed ends thereof disposed respectively inboard of the opposite end portions of the hose so that the end portions can have external peripheral surfaces that have substantially circular cross-sectional configurations throughout the axial lengths thereof to readily permit the same to receive annular clamps for securement purposes without interference from the projection of the hose, the projection of the hose containing therein a deformable elongated member that has opposed ends that are also respectively disposed inboard of the opposite end portions of the hose.

For example, one embodiment of this invention provides a shape retention hose construction comprising a length of flexible tubular hose formed mainly of polymeric material and having opposite end portions and an intermediate body portion that defines internal and external peripheral surface means of the hose, and shape retention means carried by the hose and being adapted to generally retain the shape of the hose construction when the hose and its carried shape retention means are jointly bent into a particular shape, the shape retention means comprising a deformable elongated member having opposed ends, said hose having a radially outwardly disposed and longitudinally extending projection on the external peripheral surface means thereof, the elongated member being longitudinally disposed in the projection, the projection having opposed ends that respectively are disposed inboard of the opposite end portions of the hose, the opposed ends of the elongated member also being respectively disposed inboard of the opposite end portions of the hose, the end portions of the hose respectively having external peripheral surfaces that have substantially circular cross-sectional configurations throughout the axial lengths thereof.

Accordingly, it is an object of this invention to provide a new shape retention hose construction having one or more of the novel features of this invention as set forth above or hereinafter shown or described.

Another object of this invention is to provide a new method of making a shape retention hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is a view similar to FIG. 2 and illustrates the hose construction of FIG. 2 bent into a particular shape.

FIG. 5 is a fragmentary view illustrating the hose construction of FIG. 4 being mounted to a radiator horn of the engine of FIG. 1, FIG. 5 being partially in cross section.

FIG. 6 is a view similar to FIG. 2 and illustrates another shape retention hose construction of this invention.

FIG. 7 is a fragmentary view similar to FIG. 2 and illustrates another shape retention hose construction of this invention.

FIG. 8 is a view similar to FIG. 7 and illustrates the shape retention hose of FIG. 7 bent into a particular shape.

FIG. 9 is a view similar to FIG. 3 and illustrates another shape retention hose construction of this invention.

DESCRIPTION OF THE PREFERRED EMBODIMENTS

Figure 3:
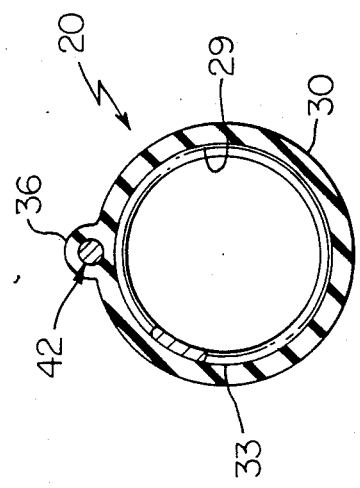
FIG. 3 is a cross-sectional view taken on line 3—3 of FIG. 2.

While the various features of this invention are hereinafter illustrated and described as being particularly adapted to provide a hose construction for use with the cooling system of an internal combustion engine, it is to be understood that the various features of this invention can be utilized singly or in various combinations thereof to provide a hose construction for other structures as desired.

Therefore, this invention is not to be limited to only the embodiments illustrated in the drawings, because the drawings are merely utilized to illustrate one of the wide variety of uses of this invention.

Figure 1:
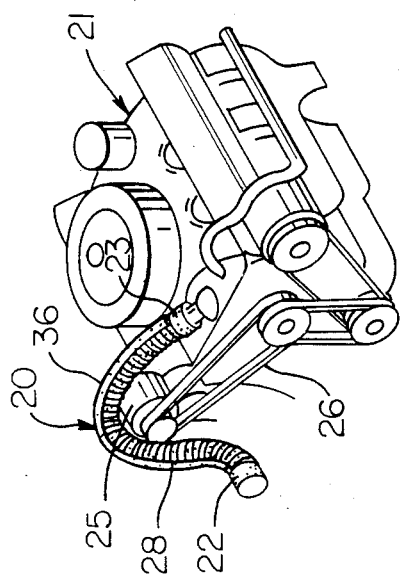
FIG. 1 is a top perspective view of an internal combustion engine for a transportation vehicle or the like and utilizing the shape retention hose construction of this invention.

Referring now to FIGS. 1-5, a new shape retention hose construction of this invention is generally indicated by the reference numeral 20 and is illustrated in FIG. 1 as being utilized as part of the cooling system of an internal combustion engine that is generally indicated by the reference numeral 21, the hose construction 20 being illustrated in FIG. 1 as having been bent into a particular shape so that the opposed end means or portions 22 and 23 thereof can be interconnected to the desired tubular coupling means of the engine 21, such as to the tubular radiator horn 24, FIG. 5, in a manner hereinafter set forth, so that the bent hose construction 20 can avoid engine components that would normally be disposed in the path thereof, such as component 25 and its associated belt means 26, all for the reasons well known in the art. For example, see the aforementioned U.S. Pat. No. 4,669,508 to Neaves, and the U.S. Pat. No. 4,463,779 to Wink et al, whereby these two patents are being incorporated into this disclosure by this reference thereto.

Since the reasons for providing a shape retention hose construction are well known in the art, only the details of the new shape retention hose constructions of this invention will now be set forth.

The hose construction 20 of this invention comprises a length of flexible tubular hose 27 formed mainly of polymeric material and having the opposite end portions 22 and 23 and an intermediate body portion 28 that defines an internal peripheral surface means 29 of the hose 27 and an external peripheral surface means 30 of the hole 27, the body portion 28 of the hose 27 being corrugated in a helical manner that is well known in the art so as to define a plurality of crests 31 and valleys 32 in the internal peripheral surface 29 that is adapted to readily receive a helically wound reinforcing wire 33 in the valleys 32 thereof in a conventional manner to tend to prevent collapse of the hose 27 under vacuum conditions therein. The exterior peripheral surface means 30 of the body portion 28 of the hose 27 likewise has a plurality of alternating crests 34 and valleys 35 therein except for a radially outwardly disposed and longitudinally extending projection 36 of the hose 27 that is formed on the external peripheral surface means 30 thereof, the projection 36 being formed integral and homogeneous with the body portion 28 of the hose 27 and having opposed ends 37 and 38 that are respectively disposed inboard of the opposite end portions 22 and 23 of the hose 27.

In this manner, the projection 36 does not extend onto the end portions 22 and 23 of the hose 27 so that the end portions 22 and 23 of the hose 27 can have external peripheral surfaces 39 that have substantially circular cross-sectional configurations throughout the axial length thereof as well as have internal peripheral surfaces 40 that have substantially circular cross-sectional configurations throughout the axial length thereof whereby the end portions 22 and 23 are adapted to be telescoped onto the desired supporting structure, such as the radiator horn 24 as illustrated in FIG. 5 and be readily clamped thereto by an annular clamping means 41 in a conventional manner without having the projection 36 interfere with such mounting arrangement at the end portions 22 and 23 of the hose construction 20 of this invention.

The hose construction 20 of this invention includes a shape retention means that is generally indicated by the reference numeral 42 and is contained within the projection 36 of the hose 27, the shape retention means 42 comprising a deformable elongated member 43 having opposed ends 44 and 45 and being completely embedded in the projection 36 so that the ends 44 and 45 not only are disposed inboard of the end portions 22 and 23 of the hose 27, but also the ends 44 and 45 of the elongated member 43 are disposed inboard of the ends 37 and 38 of the projection 36.

The elongated member 43 of this invention can be formed of any suitable shape retention material, such as the metallic material illustrated in the drawings, and can have any desired cross-sectional configuration rather than the circular cross-sectional configuration illustrated in the drawings. However, in one working embodiment of the shape retention member 43 of this invention the shape retention member 43 comprises a steel rod-like member having a diameter of approximately one-eighth of an inch.

In any event, it can be seen that the hose construction 20 of this invention is adapted to be bent into the desired shape thereof as illustrated in FIG. 4 so as to conform to the particular path required therefor for an engine mounting arrangement, such as the arrangement illustrated in FIG. 1, with the end cuffs 22 and 23 being positioned so that the same will couple to the desired structure and provide a flow path therebetween, the bent shape retention means 42 tending to hold the hose construction 20 in such bent shape thereof as the same is formed of deformable material.

For example, reference is now made to FIG. 5 wherein it can be seen that the end portion or cuff 22 of the hose construction 20 is telescoped onto the cylindrical radiator horn 24 of a conventional engine radiator 46 and is held thereon by the annular clamp means 41 in a manner conventional in the art. Because the adjacent end 37 of the projection 36, as well as the adjacent end 44 of the elongated member 43, does not extend onto the cuff end portion 22, the shape retention means 42 and projection 36 do not hinder the use of the clamp 41 in compressing and sealing the end portion 22 onto the horn 24 in a conventional manner. In addition, since the shape retention means 42 is disposed outside of the flow path that exists through the hose construction 20, the shape retention means 42 does not interfere with fluid flow into or out of the horn 24 in any manner.

Of course, the other end portion or cuff 23 of the hose construction 20 is adapted to be interconnected to its desired structure, such as the block of the engine 21 of FIG. 1, in a manner similar to the end portion 22 as illustrated in FIG. 5.

Figure 2:
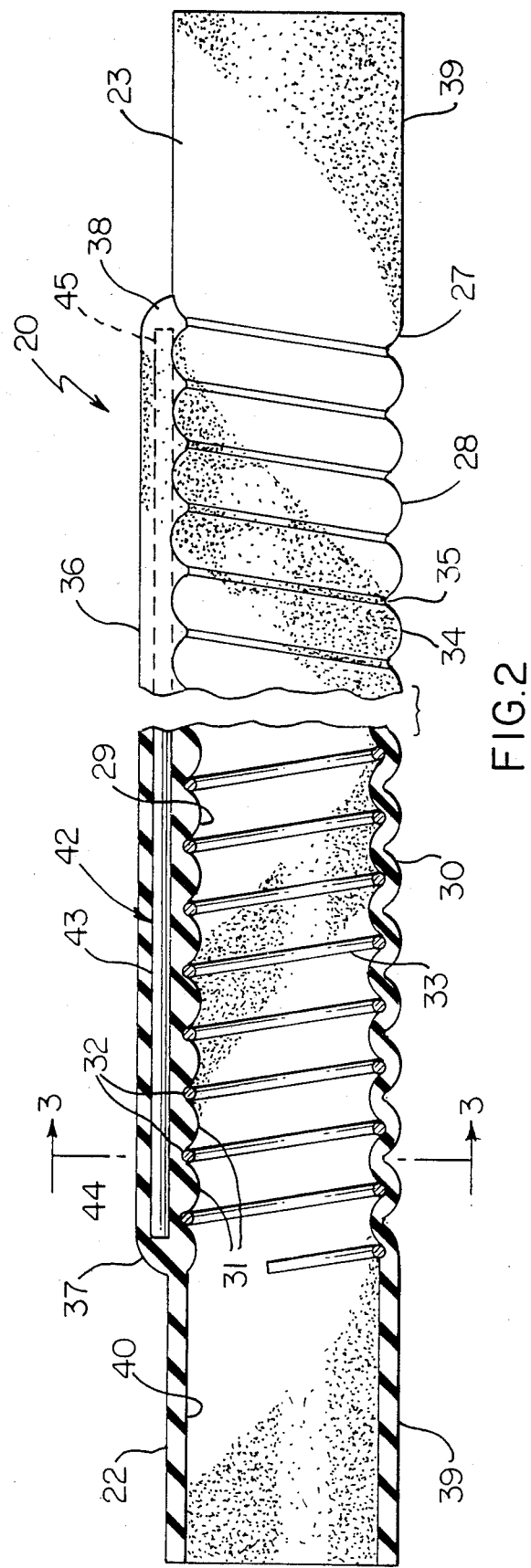
FIG. 2 is an enlarged view of the shape retention hose construction of FIG. 1 in the unbent condition thereof, FIG. 2 being partially in cross section and partially in elevation.

Therefore, it can be seen that it is a relatively simple method of this invention to form the hose construction 20 of this invention by having the shape retention means 42 be embedded in the projection 36 as the projection 36 and hose 27 are being molded into the configuration illustrated together with the corrugations being molded into the body portion 28 in the manner previously set forth whereby the resulting hose construction 20 can remain in the substantially straight configuration as illustrated in FIG. 2 until it is desired to bend the same into a particular shape before attaching the end portions 22 and 23 to the desired structure.

For example, it is well known that the number of molded curved hose sizes for replacement automotive, industrial and marine hose applications has grown far beyond what is practical for a parts house or service station to keep in stock, let alone have manufacturers produce in an economical manner. As a result, the hose construction 20 of this invention readily permits the same to be formed by hand into any one of a multitude of desired shapes and be retained in that shape so that the hose construction 20 of this invention can be utilized for many different applications whereby inventory costs for a parts house or service station can be substantially reduced.

Since the wire reinforcing means 33 of the hose 27 of the hose construction 20 previously described will normally prevent collapse of the hose 27 under vacuum conditions therein, it may be found that it is not necessary for the shape retention means 42 of this invention to extend substantially all the way to the end cuffs 22 and 23 of the hose 27 but can be located in merely the medial portion of the hose 27 for its shape retention purposes. Nevertheless, because the shape retention means 42 can also perform a reinforcing function for the hose 27, it may be found that the hose 27 need not have the wire reinforcing means 33.

Also, it may be found that it is not necessary to have the body portion 28 of the hose 27 corrugated for the flexibility thereof nor utilize the wire means 33 for the reinforcing thereof.

For example, another shape retention hose construction of this invention is generally indicated by the reference numeral 20A in FIG. 6 and parts thereof similar to the hose construction 20 previously set forth are indicated by like reference numerals followed by the reference letter "A".

As illustrated in FIG. 6 it can be seen that the tubular hose 27A has a substantially smooth internal peripheral surface 47 throughout the entire length thereof so that not only do the end portions 22A and 23A have an interior surface that defines a circular cross-sectional configuration throughout the axial length thereof, but also the body portion 28A of the hose 27A has the same internal surface means 47 with a generally circular cross-sectional configuration throughout the axial length thereof even though the body portion 28A also has the projection 36A thereon that carries the shape retention means 42A therein. Similarly, the exterior peripheral surface 48 of the hose 27A is smooth and defines a substantially circular configuration thereof throughout the entire axial length of the hose 27A except at the projection 36A on the body portion 28A thereof as illustrated in the drawings.

Since the shape retention means 42A performs its shape retaining function in the same manner as the shape retention means 42 previously described, it can be seen that it is relatively simple to form the hose construction 20A into the desired shape by merely hand bending the hose construction 20A into that desired shape.

While it is believed that the projection 36 or 36A of the hose constructions 20 and 20A of this invention is sufficiently resilient to permit the projection 36 to elongate between the end portions 37 and 38 thereof when the hose construction 20 is bent into an arcuate shape wherein the projection 36 is on the inside of the curve (such as illustrated in FIG. 8), it is to be understood that suitable openings 49 could be formed in the respective ends 37 and 38 of the projection 36 in the manner illustrated in FIGS. 7 and 8 so that the openings 49 will be fully aligned with the elongated member 43 and be of a size to permit the respective ends 44 and 45 thereof to extend into the openings 49 and even out of the same in the manner illustrated in FIG. 8 to compensate for the bending of the hose construction 20 into a tight arcuate configuration with the projection 36 being on the inside of such arcuate shape as illustrated in FIG. 8.

In addition, it is to be understood that the elongated member 43 of the hose construction 20 of this invention can be reinforced by having the same wrapped with suitable fabric material 50 throughout the length thereof as illustrated in FIG. 9 whereby the elongated member 43 will not be bonded to the projection 36 but will be readily movable relative thereto because of the intervening fabric material 50 as illustrated in FIG. 9.

Accordingly, it can be seen that many variations can be provided in a flexible hose for accommodating the shape retention member of this invention in a longitudinal projection thereof with such shape retention member still performing its shape retention function in the manner previously set forth.

Thus, it can be seen that this invention not only provides a new shape retention hose construction, but also this invention provides a new method of making such a shape retention hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a shape retention hose construction comprising a length of flexible tubular hose formed mainly of polymeric material and having opposite end portions and an intermediate body portion that defines internal and external peripheral surfaces of said hose, and shape retention means carried by said hose and being adapted to generally retain the shape of said hose construction when said hose and its carried shape retention means are jointly bent into a particular shape, said shape retention means comprising a deformable elongated member having opposed ends, said hose having a radially outwardly disposed and longitudinally extending projection on said external peripheral surface thereof, said elongated member being longitudinally disposed in said projection, the improvement comprising the steps of forming said projection with opposed ends that respectively are disposed inboard of said opposite end portions of said hose, forming said opposed ends of said elongated member to also be respectively disposed inboard of said opposite end portions of said hose, forming said end portions of said hose to respectively have external peripheral surfaces that have substantially circular cross-sectional configurations throughout the axial lengths thereof, forming said opposed ends of said elongated member to be respectively disposed inboard of said opposed ends of said projection, and forming said opposed ends of said projection to respectively have openings therein that are respectively aligned with said opposed ends of said elongated member to permit said ends of said elongated member to move in said openings relative to said projection when said hose construction is bent in a certain manner.

2. A method of making a hose construction as set forth in claim 1 and including the step of disposing fabric around said elongated member to reinforce the same in said projection.

3. A method of making a hose construction as set forth in claim 2 and including the step of forming said elongated member to be rod-like.

4. A method of making a hose construction as set forth in claim 1 and including the step of corrugating said body portion of said hose to provide alternating valleys and crests in said external peripheral surface of said body portion of said hose except in said projection thereof.

5. A method of making a hose construction as set forth in claim 4 wherein the step of corrugating said body portion of said hose provides alternating valleys and crests in said internal peripheral surface of said body portion of said hose.

6. A method of making a hose construction as set forth in claim 5 wherein the step of corrugating causes said alternating valleys and crests to be disposed in a helical manner.

7. A method of making a hose construction as set forth in claim 6 and including the step of disposing a helically wound wire in said valleys of said internal peripheral surface of said body portion of said hose to reinforce the same.

* * * * *